United States Patent [19]

Bilal et al.

[11] 3,932,225
[45] Jan. 13, 1976

[54] PROCESS FOR SEPARATELY RECOVERING URANIUM, TRANSURANIUM ELEMENTS, AND FISSION PRODUCTS OF URANIUM FROM ATOMIC REACTOR FUEL

[75] Inventors: Abdel-Lativ Bilal; Klaus Metscher; Bernhard Mühlig; Christoph Reichmuth; Bernd Schwarz; Karl-Erik Zimen, all of Berlin, Germany

[73] Assignee: Hahn-Meitner-Institut fur Kernforschung Berlin GmbH, Berlin, Germany

[22] Filed: Nov. 3, 1972

[21] Appl. No.: 303,377

[30] Foreign Application Priority Data
Nov. 3, 1971 Germany............................ 2154655

[52] U.S. Cl..................................... 204/1.5; 423/3
[51] Int. Cl.²........................................ C01G 56/00
[58] Field of Search............... 204/1.5; 252/301.1 R; 423/3

[56] References Cited
UNITED STATES PATENTS

| | | | |
|---|---|---|---|
| 3,336,208 | 8/1967 | Raviv et al............................ | 204/1.5 |
| 3,490,999 | 1/1970 | Raviv et al............................ | 204/1.5 |
| 3,515,655 | 6/1970 | Raviv et al............................ | 204/1.5 |
| 3,821,091 | 6/1974 | Bilal et al.............................. | 423/3 |

OTHER PUBLICATIONS

Slansky et al., "Nuclear Science and Engineering" 12, 33–38 (1962).
Bilal, Chemie Ingenieur Technick 42 Jan. 1970, 1090–1094.
Behne Radiochemical & Radioanalytical Letters Vol. 6, No. 1, pp. 39–43.

*Primary Examiner*—Benjamin R. Padgett
*Assistant Examiner*—B. H. Hunt
*Attorney, Agent, or Firm*—Hans Berman; Kurt Kelman

[57] ABSTRACT

Spent reactor fuel elements are dissolved in dilute nitric acid. After addition of acetic acid as a complexing agent, the nitric acid is partly decomposed and the mixture subjected to electrolysis while a carrier liquid, which may be dilute acetic acid or a dilute mixture of acetic acid and nitric acid is caused to flow in the electric field between the electrodes either against the direction of ion migration or transversely thereto. The ions of uranium, plutonium and other transuranium elements, and of fission products accumulate in discrete portions of the electrolyte and are separately withdrawn as at least three fractions after one or more stages of electrolysis.

8 Claims, 7 Drawing Figures

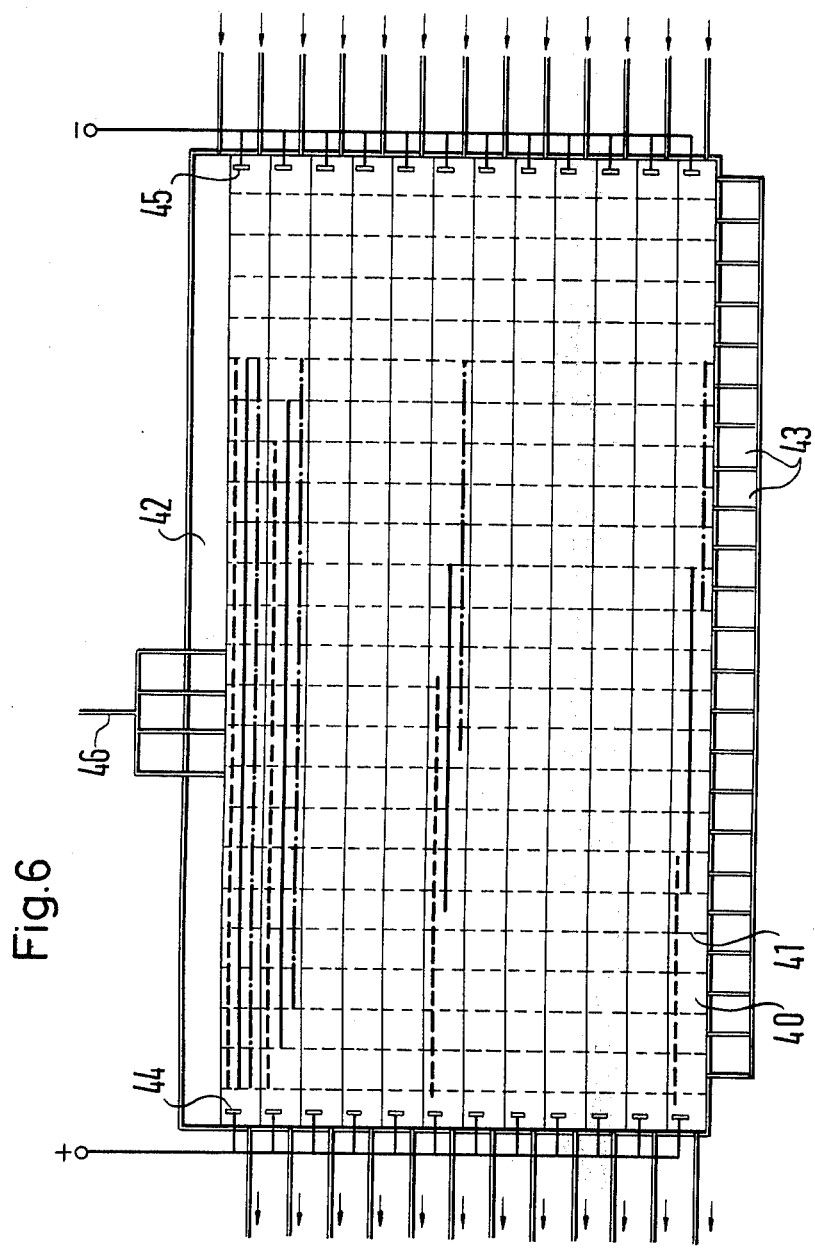

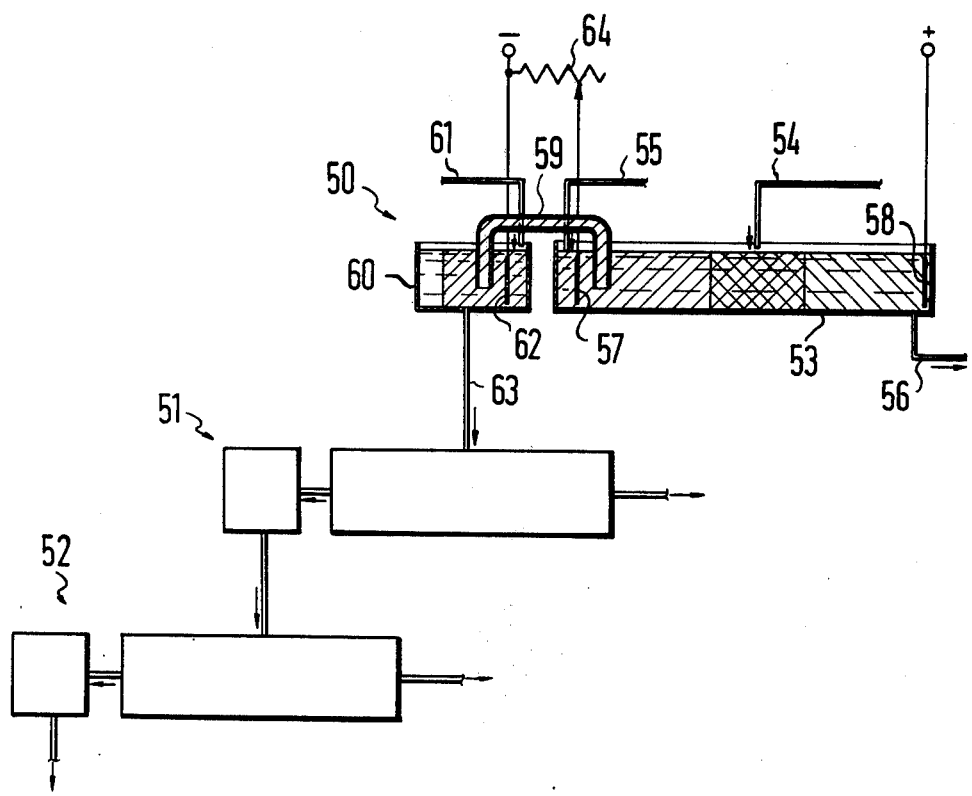

PROCESS FOR SEPARATELY RECOVERING URANIUM, TRANSURANIUM ELEMENTS, AND FISSION PRODUCTS OF URANIUM FROM ATOMIC REACTOR FUEL

This invention relates to a process for separately recovering uranium, the transuranium elements, and fission products from spent atomic reactor fuel.

Numerous methods of fractionating spent reactor fuel have been proposed, and some are in current practical use. It is known, for example, to separate plutonium from uranium and the fission products other than zirconium and the lanthanides by precipitation from a strongly acidic aqueous solution with $BiPO_4$, and further to purify the plutonium-bearing fraction. The method however, does not separate uranium from fission products and can be performed batchwise only. Batch processes are difficult to carry out by remote control, a necessary condition when handling strongly radioactive material.

It is also known to extract the solution of the spent fuel elements with organic solvents such as tri-n-butyl phosphate, methylisobutyl ketone, dibutoxydiethyl ether, and tertiary amines. The extraction methods permit plutonium to be isolated and uranium to be recovered, but the other transuranium elements and the fission products cannot be separated. The separation of plutonium from uranium involves a difficult redox treatment of the plutonium which requires the process to be burdened with large amounts of reagents. The extracting agents are partly decomposed by radiation with unfavorable effects on the separation achieved. Loss of some uranium and plutonium must be accepted if the recovered elements are not to be contaminated with fission products.

Yet another known method relies on the use of ion exchange materials. These methods, however, are selective and do not permit the entire spent fuel to be fractionated. The ion exchange materials largely consist of organic compounds which are subject to chemical and radiolytic attack by the process liquid.

The primary object of the invention is the provision of a process which is free from the shortcomings of the aforedescribed known methods.

More specifically, it is an object of this invention to provide a universal method of fractionating the material of spent atomic reactor fuel which permits the separate recovery of uranium, of the transuranium elements, particularly plutonium, and of the major fission products without impairment by radiolysis and without burdening the process material with more than minimal amounts of reagents.

An additional object is the provision of a process which can be performed in continuous operation and is capable of convenient remote control.

With these and other objects in view, the invention provides a process in which the materials to be separated are subjected once or repeatedly to electrolysis between two spaced electrodes as solutes in aqueous mineral acid, preferably nitric acid, in the presence of a complexing agent which is preferably a carboxylic acid and water soluble, a carrier liquid being caused to flow through the electrolyte either in the direction of the electric field between the electrodes, or transversely to the field. The resulting accumulation of uranium, the transuranium elements, and the fission products in discrete portions of the electrolyte permits each of the three major fractions or even subfractions to be withdrawn from the electrolyte practically free from the other fractions or subfractions.

The procedure briefly described in the preceding paragraph will be referred to hereinbelow as "counter-current electrolysis" when the carrier liquid is caused to flow in a direction opposite to the direction of migration of one type of ions in the electric field, and "cross-current electrolysis", if the carrier liquid flows transversely to the direction in which ions would normally migrate in response to the potential difference between the electrodes in the absence of the superimposed flow of carrier liquid.

Counter-current electrolysis, as such, has been known heretofore (Bericht des Hahn-Meitner-Institut Berlin: HMI-B 44 [1965]; Chemie-Ingenieur-Technik 42 [1970] 1090–1094; Separation Science 6 [4] 483 [1971]). The method is based on the different migration rates of the several species of cations to be separated, a carrier solvent being caused to flow counter-current to the migrating ions at a rate to compensate for the mean migration velocity of the several species of ions so that the common center of gravity of the ions remains stationary, individual species of ions, however, migrate upstream or downstream and are thereby separated. In cross-current electrolysis, the carrier liquid is caused to flow transversely to the direction of the electric field with analogous results.

The migration rates of the several components to be separated are modified in the process of the invention in a manner greatly to improve the separation of the individual ions or of specific groups of ions by incorporating in the electrolyte a complexing agent, preferably a carboxylic acid, which forms complexes to a different degree with the several components to be separated.

Under suitable conditions, plutonium is complexed selectively so as to be converted to a neutral species whereas uranium, the transplutonium elements, and the fission products retain an electric charge. The plutonium, therefore, travels with the carrier solvent in the direction of movement of the latter, and independently of the electric field. It may thus be isolated by "electrolytic extraction" of the accompanying elements. During counter-current electrolysis in which the carrier flows toward the anode, the recovered plutonium values may still be accompanied by anions of some fission products ($TcO_4^{--}$ and polymolybdates), but may be purified of these contaminants in a simple manner by precipitation or by passage over an anion exchange column. During cross-current electrolysis, the plutonium may be withdrawn with a portion of the carrier and the electrolyte free from other components, while the cationic components are deflected toward the cathode, and are thereby divided into a uranium fraction and one or more sub-fractions containing other cationic species. The anionic components are deflected toward the anode, and may be recovered separate from all other species present.

The components of each fraction or sub-fraction may be further separated by electrolytic extraction in electrolytes differing from the original electrolyte and from each other in the kind of complex-forming ligands and their pH-depending concentration, each additional electrolysis being used for isolating groups of components and/or individual components.

The preferred complexing agents of the invention are carboxylic acids having 2 to 10 carbon atoms and at least one free carboxyl group. Acetic acid is the preferred complexing agent in the electrolyte and in the aqueous carrier solvent, but may be replaced by other water-soluble alkanoic acids having one or more carboxyl groups. Carboxylic acids have been found to be effective in concentrations from 0.5-normal to 4-normal, best results usually being obtained when the liquid electrolysis medium is 1.5 to 2.5-normal with respect to acetic acid. If the carrier additionally contains nitric acid, it should be 0.02 to 2-normal, and preferably 0.05 to 0.2-normal with respect to nitric acid. The initial electrolyte usually contains nitric acid because the spent fuel elements are normally dissolved in concentrated nitric acid. If not initially present in the electrolyte, nitric acid may be added to the latter in the amounts necessary to achieve the concentration range indicated above.

The initial electrolyte is preferably prepared from spent fuel elements by dissolving the latter in strong or concentrated nitric acid, adding the desired amount of carboxylic acid, and subsequently reducing the nitric acid concentration by the addition of a reducing agent which forms gaseous oxidation products only, such as formic acid or formaldehyde. They reduce nitric acid to nitrogen oxides only, and the latter are gaseous and readily converted again to nitric acid in a known manner.

The reducing treatment causes precipitation of palladium, selenium, and most silver in the elementary condition, while niobium, tellurium, and a portion of the molybdenum are precipitated as oxides ($Nb_2O_5$, $TeO_2$, $MoO_3$). Some silver may be precipitated as the bromide, and the residual molybdenum is present in the solution at the prevailing pH in the form of polymolybdate ions which migrate toward the anode during electrolysis. Molybdate ions do not precipitate zirconium ions at the prevailing pH, whereby the formation of gel-like precipitates is avoided, such precipitates being difficult to separate from the mother liquor and strongly adsorbing other ions.

The liquid separated from the precipitate contains Pu as an electrically neutral complex, U, and may further contain Np, Am, Cm, Rb, Cs, Sr, Ba, Zr, Ru, Rh, Cd, In, La, Ce, Pr, Nd, Pm, Sm, Eu, Gd, and Tb as cationic ions which may be simple ions or partly complexed ions. The liquid further contains nitrate ions and small amounts of polymolybdate and $TcO_4^{--}$ ions. These ions or ion complexes other than acetate and nitrate ions are separated by counter-current or cross-current electrolysis.

The invention will be described in more detail with reference to the attached drawing in which.

FIG. 6 diagrammatically illustrates the process of the invention as employed for continuously separating more than two ion components in a single stage by combined counter-current and cross-current electrolysis; and FIG. 7 shows the continuous, multiple-stage separation of a mixture having more than two ion components employing the counter-current electrolysis technique.

Figure 1:
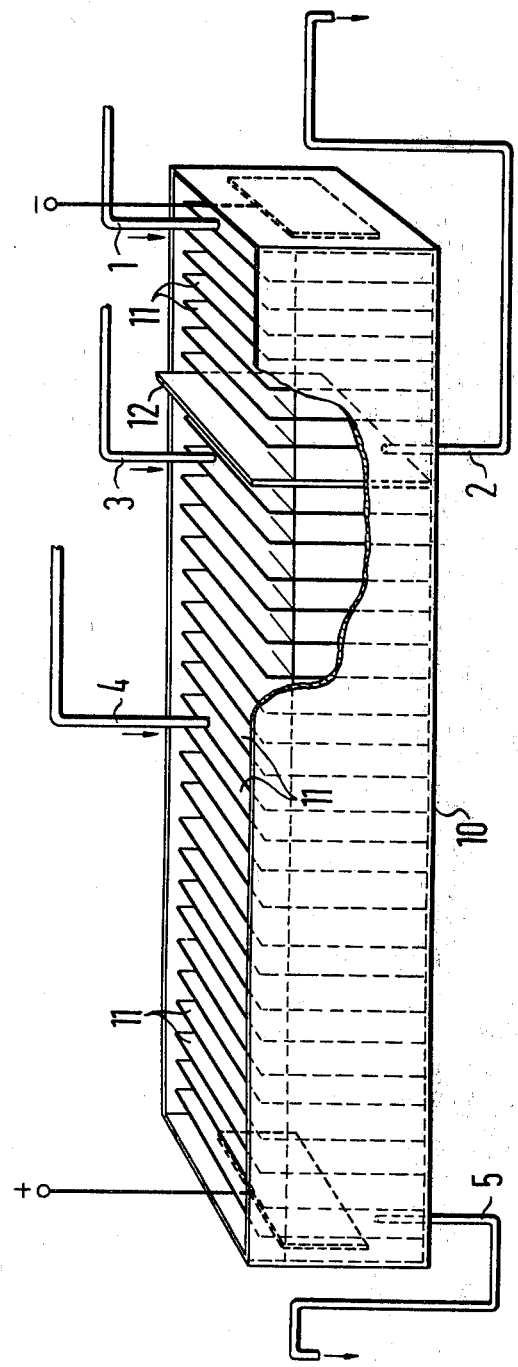
FIG. 1 shows electrolysis apparatus employed for performing the process of the invention in a perspective view, portions of a tank being shown broken away to reveal internal structure.

Referring initially to FIG. 1, there is shown a horizontally elongated, upwardly open trough of inert material which is provided with a multiplicity of longitudinally spaced, transverse partitions of nylon gauze which will be described in more detail with reference to FIG. 3. They impede, but do not prevent, the flow of liquid and permit migration of ions in an electric field established between a cathode 6 and an anode 7 in respective longitudinally terminal portions of the trough 10. A semi-permeable diaphragm 12, approximately three times as far from the anode 7 as from the cathode 6, extends across the trough 10, permits the migration of ions in the electric field, but blocks the flow of liquid.

In operating the apparatus of FIG. 1, an aqueous carrier liquid, such as dilute acetic acid or a mixture of dilute acetic acid with a little nitric acid, as described above, is fed to the ends of the two compartments separated by the diaphragm 12, which are nearest the cathode 6, through supply lines 1, 3 at a rate that may be controlled precisely by valves, not shown. The liquid to be fractionated is supplied near the center of the trough 10 through a valved line 4. Liquid is withdrawn at a controlled rate from the ends of the two compartments nearest the anode 7 through discharge lines 2, 5 equipped with overflow spouts. Non-illustrated cooling elements are distributed throughout the trough 10 to maintain a desired, uniform temperatue and to remove the heat generated by the passage of current through the electrolyte. The flow rate from the supply line 1 is controlled in such a manner that the cathode compartment does not turn alkaline, and that cations of metals migrating through the trough cannot reach the cathode 1.

The flow rates through the lines 1, 3, 4 are adjusted until a stable state is reached in which the solutions discharged from the lines 2, 5 contain only elements of respective fractions of the solution supplied at 4, each fraction being free of elements of the other fraction, except as will be described hereinbelow.

Figure 2:
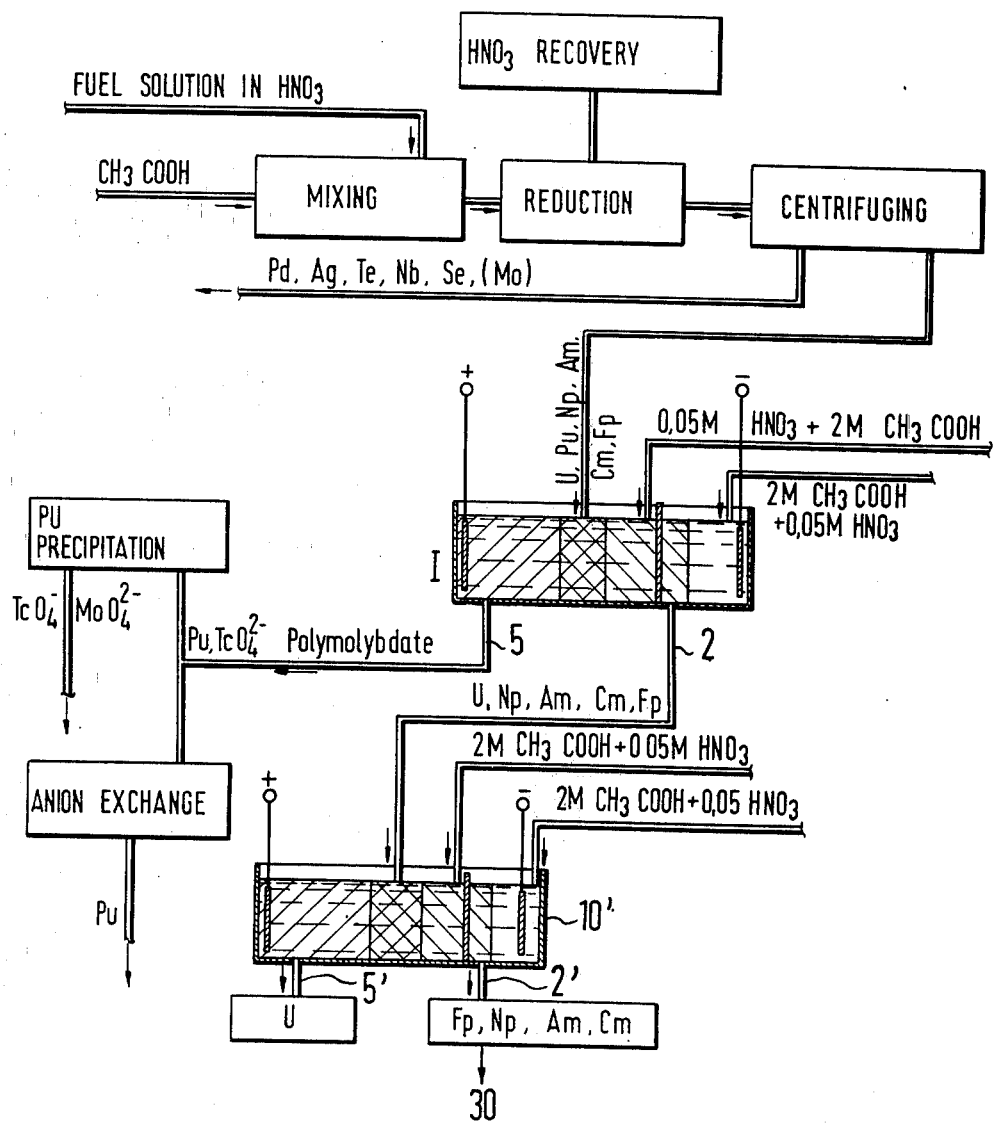
FIG. 2 is a flow sheet illustrating continuous fractionation of spent reactor fuel by multiple, sequential electrolytic extraction employing several units of apparatus as shown in FIG. 1 for counter-current electrolysis.

The use of the apparatus shown in FIG. 1 in the process of the invention is illustrated in FIG. 2.

The spent fuel elements are dissolved in strong or concentrated nitric acid, and the solution is mixed with an amount of acetic acid sufficient to make the mixture about 2-normal or 2-molar with respect to acetic acid. The mixture is further treated with formaldehyde or formic acid to reduce enough nitric acid to nitrogen oxides that the residual nitric acid makes the mixture about 0.05-normal or 0.05-molar with respect to nitric acid. The nitrogen oxides and the gaseous oxidation products of the formaldehyde or formic acid are drawn off, and the nitrogen oxide is again converted to nitric acid to be used for dissolving additional fuel elements. As described above, the reducing agent causes precipitation of Pd, Ag, Te, Nb, Se, and some Mo, and the precipitate is separated from the mother liquor in a continuously operating centrifuge, and may be further processed in a manner not relevant to this invention.

The supernatant is fed to a trough 10 of the type shown in FIG. 1, while the trough also receives an aqueous carrier liquid of 0.05 M $HNO_3$ and 2 M $CH_3COOH$ per liter in each of its two compartments. The solution of fuel constituents fed to the trough 10 contains U, Pu, Np, Am, Cm, and various fission products, jointly referred to in the drawing by the symbol Fp. As indicated by diagonal shading in the trough 10, this mixture is separated by the liquid flowing through the trough 10 and by the applied electric field.

The electrically neutral plutonium complex is carried toward the anode by the carrier liquid supplied to the larger trough compartment and discharged together with electrolyte and/or carrier liquid through the discharge line 5. The plutonium, at this stage, is contaminated with $TcO_4^{--}$ and polymolybdate anions. As shown in the drawing, the stream bearing Pu, Tc, and a portion of the Mo originally present in the spent fuel may be split, one branch being fed to a precipitation plant in which the plutonium may be precipitated as $Pu(OH)_4$ or as oxalate, the other branch being passed over an anion exchange column for removal of $TcO_4^{--}$ and polymolybdates so that a pure aqueous solution, containing plutonium as the only metal ion present, is obtained. In normal practice, only one of the two methods of separating plutonium from accompanying anions will be chosen.

The liquid withdrawn from the cathode compartment of the trough 10 through the line 2 contains uranium, the fission products Fp together with Np, Am, and Cm. It is fed to another apparatus not significantly different from that shown in FIG. 1 near the longitudinal center of its trough 10', and subjected to electrolytic countercurrent extraction with a carrier liquid identical with that employed in trough 10.

The operating conditions in the trough 10' are adjusted in such a manner that the local field strength E, the mobility $u_U$ of the uranium ions, the average flow rate v of the liquid carrier, and the mobility $u'$ of all other cations present satisfy the relationship $$Eu_U < v < Eu'$$

This condition is readily fulfilled because the mobility of the uranium ions in the system now being described is only approximately one half of that of the second slowest ions present, those of $NpO_2^+$. The liquid discharged from the anode compartment of the trough 10' at a sufficiently high flow rate of the aqueous carrier liquid contains only uranium ions. The fission products Fp, together with Np, Am, and Cm are discharged from the cathode compartment of the trough 10' through the line 2', and this subfraction may be further resolved by repeating the electrolytic extraction batchwise in a trough 30 differing from that shown in FIG. 1 by the absence of the diaphragm 12, as will be described hereinbelow with reference to FIG. 4 or in devices of the type that will presently be described with reference to FIGS. 6 and 7.

Figure 3:
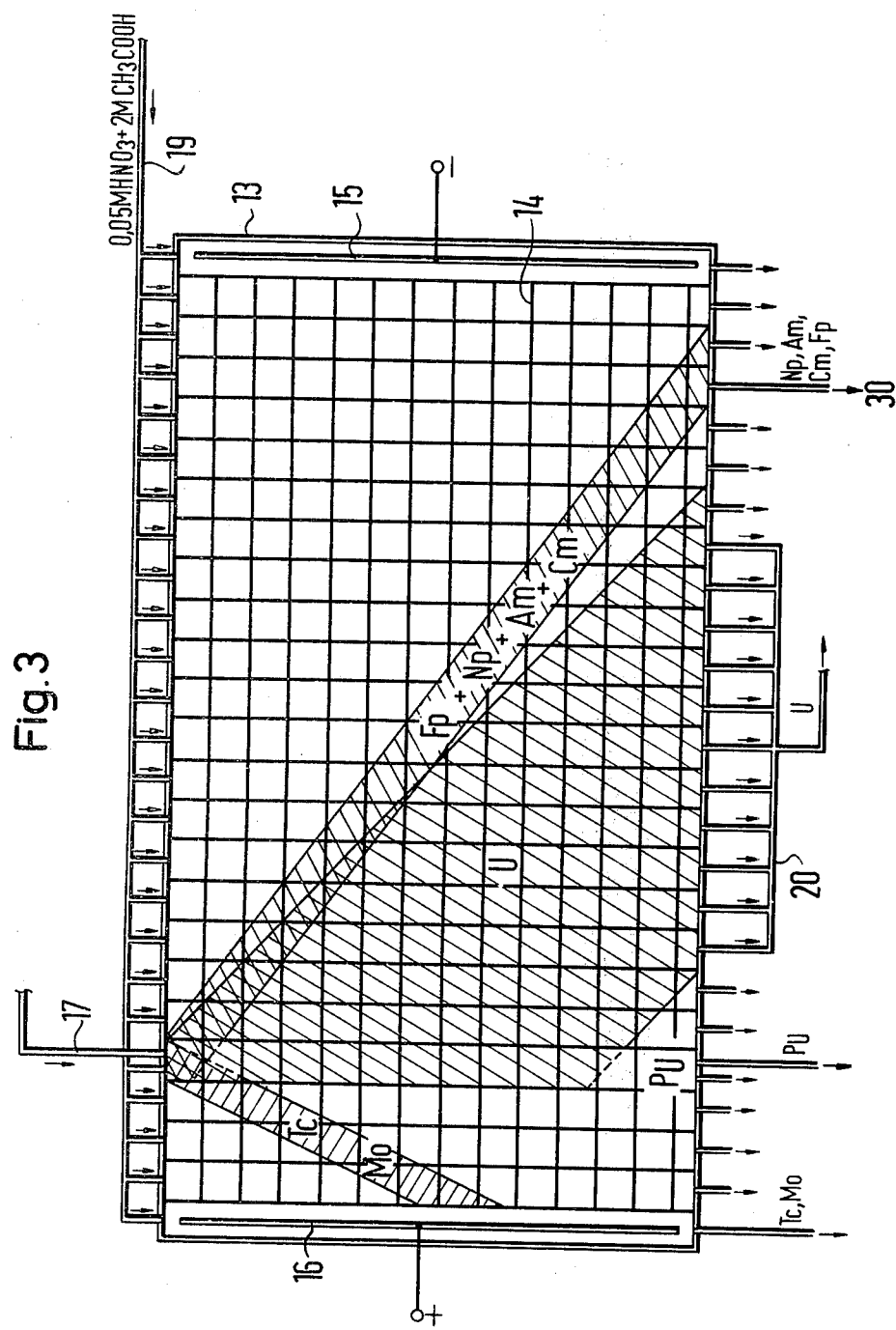
FIG. 3 is a flow sheet illustrating continuous fractionation of spent reactor fuel by cross-current electrolytic extraction according to the invention employing an electrolytic cell illustrated in top plan view.

The apparatus for cross-current electrolytic extraction shown in FIG. 3 is a rectangular, open trough 13 provided with a rectangular grid of partitions 14 of nylon gauze. Electrode compartments extending along the two narrow walls of the trough 13 are free from partitions and contain a cathode 15 and an anode 16 respectively. The remainder of the trough is divided by the partitions 14 into quadratic cells arranged in rows parallel to the short trough walls and columns parallel to the long trough wall.

The diaphragms preferred in the apparatus of FIG. 3 have polypropylene frames to which the nylon gauze is heat-sealed. Each frame bounds one side of a cell, and interlocking projections and recesses in the frames permit the same to be connected in the form of the illustrated grid. The apertures in the nylon gauze of diaphragms oriented transverse to the direction of current flow are approximately 10 microns, those in the gauze arranged parallel to the direction of current flow are approximately 50 microns in diameter. The temperature of the electrolyte is kept constant throughout the trough 13 to avoid thermal diffusion currents in the liquid. While the temperature of the electrolyte is not critical, it is preferably above ambient temperature for the sake of convenience, particularly to reduce the load on the cooling equipment, but evaporation losses are preferably minimized. From these considerations, an electrolyte temperature of 50°C is currently preferred, but any other temperature between about 30° and 70°C may provide the same advantages. As is not explicitly shown, but will readily be appreciated, each row of cells is equipped with a heat exchanger of electrically non-conductive glass, known as a "cold finger". "Cold fingers" of much smaller length are commonly employed as reflux condensers set into the necks of flasks, and also constitute the cold cores of Hopkins condensers. Water is circulated through the "cold fingers" and a refrigerated, thermostatically controlled tank. The heat exchangers are supported by the frames of the diaphragms through which they pass.

A single inlet 17 leads to the fourth row of cells from the anode 16 at one longitudinal trough wall, and an outlet 18 is connected to the other end of the same row of cells. Each row of cells and the two electrode compartments communicate with a manifold 19 through the afore-mentioned one longitudinal trough wall. Individual outlets, valved in a non-illustrated manner, lead outward from the ends of the rows of cells remote from the manifold 19, and the outlets of the eleven central rows lead into a common manifold 20. The third row of cells from the cathode 15 has an outlet 21 whose purpose will be explained hereunder.

The solution to be resolved by electrolytic extraction in the apparatus shown in FIG. 3 is prepared as explained with reference to FIG. 2. The fuel elements are dissolved in nitric acid, the solution is mixed with acetic acid, a portion of the nitric acid is destroyed by a reducing agent which also precipitates some of the fission products, and the supernatant from centrifugal removal of the precipitate is introduced into the apparatus of FIG. 3 through the inlet 17.

In the absence of an electric field, the solution, initially carrying U, Pu, transplutonium elements, and fission products, tends to travel in the fourth row of cells across the width of the trough 13. The electric field between the electrodes 15, 16 does not affect the electrically neutral plutonium complex in the solution, and plutonium is discharged from the opposite longitudinal trough wall through the outlet 18, having been stripped of all other components of the fuel elements by electrolysis.

As described above, $TcO_4^{--}$ and residual molybdenum in the form of polymolybdate are deflected toward the anode 16 and simultaneously carried across the trough 13 in each row of cells by a uniform stream of carrier liquid identical with that described with reference to FIG. 2 so that all Tc and much Mo originally introduced into the apparatus through the line 17 are discharged from the anode compartment. Uranium, neptunium, americium, and curium as well as fission products Fp are deflected toward the cathode by the electric field. The manifold 20 receives a solution containing pure uranium, while the other elements accumulate nearer the cathode and are withdrawn from the outlet 21 for further separation, if so desired, in the trough 30 shown in FIG. 4.

The valves in the several branches of the manifold 19 which maintain the same flow rate in each row of cells, and thus prevent flow of the carrier in the direction of the electric field, and the valves in the several outlets on the opposite side of the trough which serve the same purpose, have been omitted for the sake of clarity. Lateral diffusion of liquid from one row of cells into the adjacent ones cannot entirely be prevented, but it can be held to an insignificant rate.

Uranium amounts to 90% or more of the cationic components present and has a substantially smaller mobility than the others so that it can be recovered from the manifold 20 in practically pure condition. The technetium and molybdenum recovered from the anode compartment can be separated from each other by means of an anion exchange column, and the further work-up of the fraction withdrawn from the trough 13 at 21 is illustrated in FIG. 4, the same apparatus being also employed for the work-up of a corresponding fraction of transplutonium elements and fission products discharged from the apparatus of FIG. 2 through the line 2'.

Figure 4:
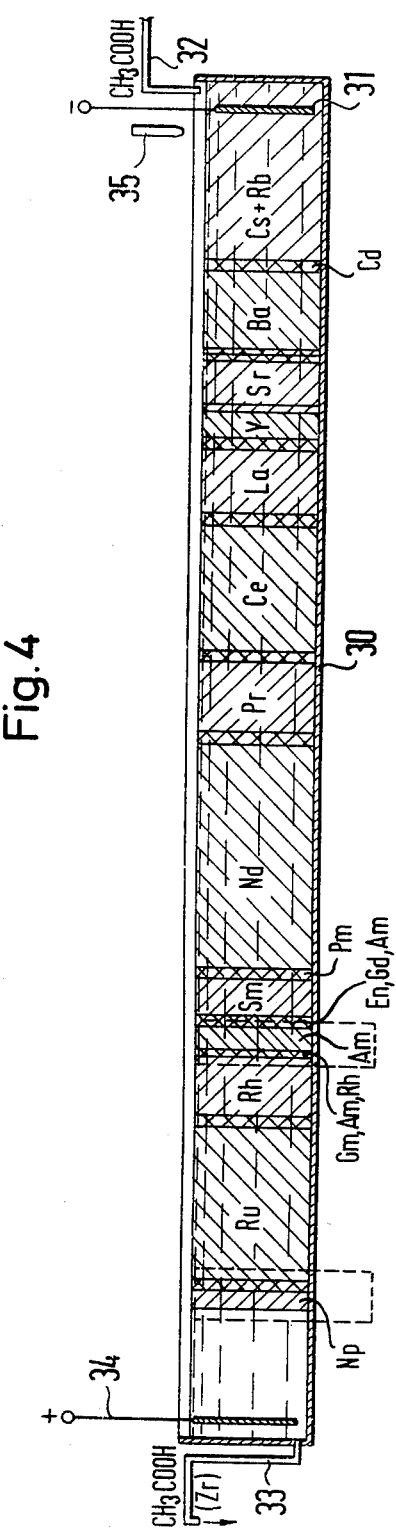
FIG. 4 illustrates the stationary distribution of the fission products, of neptunium, and of the transplutonium elements in the last stage of the separation process in apparatus similar to that of FIG. 1.

The apparatus shown in FIG. 4 has a trough 30 similar to the trough 10 shown in FIG. 1 and equipped with partitions which impede, but do not prevent, liquid flow and may be of nylon gauze as are the partitions 11 shown in FIG. 1. The partitions have been omitted for the sake of clarity. The trough 30 is not provided with a semi-permeable membrane, and is supplied with a continuous stream of 2-N acetic acid contiguously adjacent the cathode 31 through a feed pipe 32. An overflow pipe 33 communicating with the bottom of the trough 30 near the anode 34 permits a constant liquid level to be maintained in the trough.

The trough 30 was filled with a batch of the transplutonium and fission element fraction obtained in one of the processes illustrated in FIGS. 2 and 3, and the flow of current between the electrodes of dilute acetic acid was kept constant to produce a final stationary condition illustrated in FIG. 4.

Hydrogen peroxide was fed dropwise to the cathode compartment from a pipe 35 at a rate sufficient to suppress the formation of gaseous hydrogen which would have migrated with the carrier and would have precipitated rhodium in metallic form. Zirconium migrated to the anode in the electric field as a negatively charged complex, and was discharged with excess carrier liquid through the pipe 33.

The other elements present in significant amounts accumulated sequentially in the non-illustrated cells of the trough 33. A mixture of Cs and Rb was found nearest the cathode, and was followed sequentially toward the anode by Ba, Sr, Y, La, Ce, Pr, Nd, Sm, Am, Rh, Ru, and Np. Zones of the pure elements were joined by diffusion zones in which also elements present in very small amounts tended to collect. Cd thus was found in the diffusion layer between Ba and Sr, Pm between Nd and Sm, Eu and Gd between Sm and Am, and Cm between Am and Rh. The amount of Np present was so small that much of it was contained in the diffusion zone with Ru.

The several compartments were emptied simultaneously through non-illustrated drain valves into individual containers, and the contents of the containers holding the Am fraction and both adjoining diffusion layers and the Np fraction and its diffusion zone toward Ru, as indicated by broken lines in FIG. 4, were combined and subjected to another resolution process under the same conditions as described with reference to FIG. 4 in a trough 30' shown in FIG. 5, not significantly different from the trough 30 and similarly equipped with non-illustrated nylon partitions, electrodes 31, 34, feed and discharge pipes 32, 33, and a hydrogen peroxide dropper 35. A protective layer of potassium ions was maintained near the cathode 31.

Figure 5:
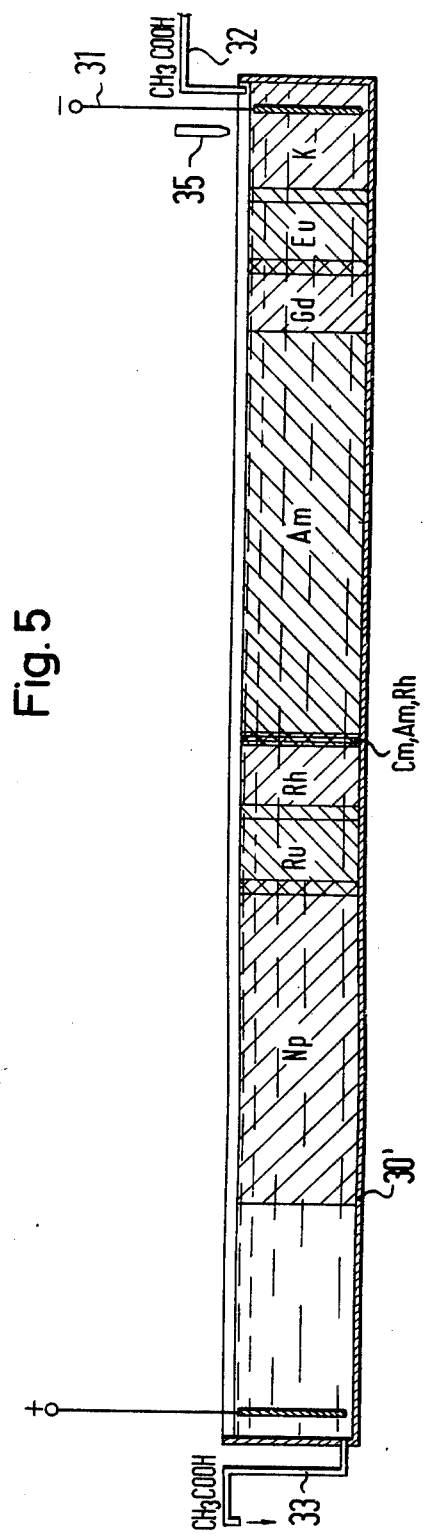
FIG. 5 illustrates the corresponding condition of similar apparatus employed for further separating the components of a sub-fraction including neptunium, americium, and curium which accumulates in a few compartments adjacent the anode compartment in the apparatus of FIG. 4.

The results achieved are evident from FIG. 5, Np, Ru, Rh, Am, Gd, and Eu were isolated with a decontamination factor greater than $10^6$, and similar results were achieved in the preceding fractionation illustrated in FIG. 4 for all significant constituents. Cm was present only in trace amounts in the fractionated fuel elements, but it was separated from the bulk of Am in the procedure of FIG. 5 in the diffusion zone toward Rh. It could have been isolated, if so desired, by once more repeating the electrolytic extraction process.

It is a particular advantage of the process of the invention that the transplutonium elements are cleanly separated from the lanthanides in a much simpler manner than by the cation exchange resin treatments employed heretofore.

The process of the invention permits mixtures of substances of the type described, more specifically spent fuel elements from atomic reactors of all kinds, to be separated into the individual components in a simple manner which is readily controlled. The high decontamination factors mentioned above are achieved without significant loss of the materials processed. This is a particular advantage in the work-up of fuel elements from fast breeder reactors which may contain 10 to 20% plutonium. The entire procedure may be carried out in an aqueous medium with minimal amounts of reagents not subject to radiolytic destruction. Not only plutonium, but also the transplutonium elements and the important fission products are recovered individually, thereby permitting the isolation and separate handling of radioactive fission products having a long half-life. It is a particular advantage of the process of the invention that it permits continuous operation with automatic controls, intervention of a human operator being readily accomplished by remote control as far as required.

The following Examples further illustrate the invention with reference to the devices shown in FIGS. 1 to 5.

EXAMPLE 1

The apparatus illustrated in FIG. 2 was supplied with an aqueous solution obtained by dissolving reactor fuel elements in nitric acid, further processing the solution in the manner described with reference to FIG. 2, until it contained, per liter:

0.3 mole uranyl nitrate,
0.01 mole plutonium$^{IV}$ nitrate,
0.00008 mole Am$^{241}$ nitrate,
5 mCi Cm$^{242}$,
0.00007 mole Np$^{237}$ nitrate, 2 mole acetic acid,
0.05 mole nitric acid, and
5% fission products, based on the uranium weight.

Formic acid was used in partly destroying the nitric acid employed for dissolving the fuel elements, and the precipitate formed thereby was removed.

The solution was fed to the first electrolytic trough at a rate of 30 ml per hour. A solution of 2 mole acetic acid and 0.05 mole nitric acid per liter was supplied to the cathode portion of the trough at 50 ml per hour and to the anode portion at 10 ml per hour. The trough had a length of 30 cm and contained 270 $cm^3$ liquid. The partitions and cooling fingers present, but not illustrated, reduced the effective flow section to 5 $cm^2$. The liquid in the trough was cooled at a rate of approximately b 1 watt per $cm^3$.

The voltage applied to the electrodes was 550 V, and the current flow was 500 mA when a steady state was reached. The local field strength was determined to be 10 V/cm in the zone of the trough holding the original mixture and in the cathode portion from which U, Np, Am, Cm and the fission products were withdrawn. It was 20 V/cm were plutonium was withdrawn, and 40 V/cm in the zone near the cathode between the pipes 1 and 2 which was practically free of salts.

In the two fractions discharged from the first trough 10, the decontamination factor of plutonium relative to the cationic components including uranium was better than $10^8$, and the cationic components showed a decontamination factor greater than $10^8$ with respect to Pu, Tc, and Mo.

The solution containing uranium and other cationic components was partly evaporated to increase its concentration and fed to the trough 10' which was operated under similar conditions as the trough 10 to produce a uranium fraction having a decontamination factor better than $10^8$ and a fraction containing the transuranium elements and fission products, which was further resolved as described with reference to FIGS. 4 and 5.

The specific operating conditions maintained in the trough 10', which had the same dimensions as the trough 10, included flow rates of the same carrier liquid as for the trough 10 of 50 ml and 10 ml per hour respectively, and a supply of the solution to be resolved at a rate of 30 ml per hour. The applied potential was 400 V and produced a current of 450 mA. The field strength was 8 V/cm where the mixture to be fractionated was fed to the trough, 7 V/cm where the uranium was withdrawn, 12 V/cm where the other components left the trough, and 35 V/cm in the salt-free area near the cathode.

The yield of plutonium and uranium, as determined by the ratio of Pu and U supplied and Pu and U isolated, was 100% as soon as stationary conditions were achieved.

EXAMPLE 2

The process of the invention was carried out on a laboratory scale in apparatus of the type shown in FIG. 3. The trough 13 had a length of 45 cm and a width of 26 cm. Its height was 3 cm, and it was filled with liquid to a depth of 0.5 cm. The effective cross section of the trough as measured from the orifice of the pipe 17 across the width of the point free from uranium, times the liquid depth, was 10 $cm^2$. A potential of 500 V was applied to the electrodes, and the field strength thus was 11 V/cm on an average. The current was 0.4 amp., and the cooling capacity of the apparatus was 0.5 $W/cm^3$. The total amount of carrier liquid discharged from the manifold 19 was 500 ml per hour. The fuel element solution was fed to the apparatus at a rate of 0.02 mole per hour. Its metal content consisted of 94% U, 3% Pu, and 3% fission products and transplutonium elements. It was prepared as described in Example 1.

The three principal fractions were recovered at a yield of 100% and had each a decontamination factor of better than $10^8$ relative to the other two fractions.

EXAMPLE 3

A trough of the type described with reference to FIG. 4 was employed for resolving batches of mixed transplutonium elements and fission products withdrawn from the process described in Example 1 after a full day's operation, and from the process described in Example 2 after half a day's operation.

The trough had a length of 1 meter and was provided with approximately 200 transverse nylon gauze partitions. The effective cross section of the liquid in the trough was 3 $cm^2$, and the salts to be separated occupied about 90 cm of the length when a stationary distribution was reached.

A potential of 3000 V was applied to the electrodes, and the current flow was constant at 0.3 amp. 2-Normal acetic acid was continuously fed to the cathode zone at a rate of 60 ml per hour.

The individual components withdrawn from areas other than the diffusion zones shown in FIG. 4 had a decontamination factor greater than $10^6$ and were recovered in a yield of approximately 80%.

The components accumulated in the areas enclosed by broken lines could not be resolved in the same run. They were transferred to another trough, as is shown in FIG. 5, which had a length of 80 cm of which 72 cm were occupied by the salts to be separated when a stationary state was established. The effective cross section of the trough was 0.25 $cm^2$. An applied voltage of 3000 volt produced a current flow of 25 mA while 2-normal acetic acid was supplied at a rate of 5 ml per hour.

FIG. 6 illustrates apparatus which has been employed successfully for further resolving the fraction of transplutonium elements, neptunium, and fission products discharged from the devices of FIGS. 2 and 3, and which combines the modes of operation of the devices shown in FIGS. 1 and 3.

Elongated troughs 40 are juxtaposed in a common horizontal plane and are each partitioned into many transversely aligned cells by means of nylon diaphragms 41. A trough 42 free from diaphragms extends along one side of the group of troughs 40, and receptacles 43 are transversely aligned with respective cells in a row along the other side of the group of troughs 40. The longitudinally terminal cells in each trough 40 contain anodes 44 and cathodes 45, and pipes communicating with the anode and cathode cells of each trough 40 permit a carrier liquid to be passed longitudinally through the trough in the manner shown in FIGS. 4 and 5. Carrier liquid is also supplied to the trough 42 which contains neither partitions nor electrodes. The several anodes 44 and cathodes 45 are connected in parallel to a source of direct current. A manifold 46 supplies the solution of the fraction to be resolved to the cells near the center of the trough 40 adjacent the trough 42.

A cover, not illustrated, normally covers the arrangement of troughs 40, 42, and carries capillary pipets arranged in rows and columns at right angles to the rows, the number of columns being equal to the number of troughs 40 plus one. The cover may be shifted from a position in which the topmost column of pipets, as viewed in FIG. 6 dips into the trough 42 and another position in which the lowermost column of pipets dips into the receptacles 43. In both positions of the non-illustrated cover, a pipet reaches into the liquid in each cell of each trough 40. The pipets are connected to a vacuum line by a manifold and a two-way valve which permits the pipets to be connected jointly with the vacuum line or with the atmosphere.

As indicated diagrammatically in FIG. 6 by broken lines, full lines, and chain-dotted lines respectively, a three-component fraction supplied to the topmost trough 40 as an aqueous liquid from the manifold 46 extends initially over the central portion of the first trough. The components migrate toward the cathode 42 at different rates counter-current to a carrier liquid which passes longitudinally through each trough 40. At regular, frequent intervals, additional carrier liquid and electrolyte is drawn into the non-illustrated pipettes by vacuum from the troughs 40, 42, and the cover with the charged pipets is shifted into its other position in which air is admitted into the pipets, and the liquid drawn from the topmost trough 40 is discharged into the adjacent trough 40 and is replaced in the topmost trough 40 by carrier liquid from the trough 42, while liquid from the lowermost trough is transferred to the receptacles 43. The cover thereafter is returned to its starting position.

As this procedure is repeated, a steady state is reached in which the three fractions are almost separated in the lowermost trough 40, and the batches of liquid collected in most of the receptacles 43 contain pure fractions.

In an actual embodiment of the apparatus illustrated in FIG. 6, 20 troughs 40 were juxtaposed. The electrodes 44, 45 received a potential difference of 500 V, and the current flowing in each trough 40 was 80 mA. A total of 250 ml 0.5-N acetic acid was passed longitudinally through the troughs 40 during each hour, while simultaneously 25 ml of the same liquid passed through the electrolytic cells from the trough 42 to the receptacles 43 together with 3 ml of the mixed solution which entered the apparatus through the manifold 46. There were approximately 200 individual cells in each trough 40, which was 100 cm long and 2.5 cm wide.

The transplutonium elements, neptunium, and the fission products were resolved continuously in this apparatus in a single stage about as efficiently as in the two-stage batch operation described with reference to FIGS. 4 and 5. The pure components of the original mixture were recovered in a yield of approximately 80%, and the decontamination factor in the pure fractions was approximately $10^6$ except for the lanthanides which were separated from each other with a decontamination factor of $10^3$.

FIG. 7 shows apparatus of the invention for separating the mixture of minor components discharged from the devices of FIGS. 2 and 3 in a multiple stage arrangement of which only one stage 50 is illustrated in detail, the identical stages 51, 52 being shown in simplified outline.

Each stage has an elongated trough 53 similar in shape and arrangement to the troughs shown in FIGS. 4 and 5 and equipped with non-illustrated nylon gauze partitions on polypropylene frames. The liquid discharged from the apparatus of FIG. 2 at 2' or the apparatus of FIG. 3 at 21 is fed continuously at a metered rate to the approximate longitudinal center of the trough 53 through a pipe 54. Carrier liquid is fed to one longitudinal end at a valve-controlled rate through a pipe 55 and withdrawn from the other end through a pipe 56. A cathode 57 is arranged in the trough 53 near the pipe 55 and an anode 58 near the pipe 56.

An electrolytic bridge, that is, a thin glass tube filled with electrolyte, has one orifice in the trough 53 offset a small distance from the cathode 57 toward the anode 58 and another orifice in a container 60 on the same level as the trough 53 and equipped with an auxiliary cathode 62. More carrier liquid is fed to the container 60 behind the cathode 62 through a pipe 61, and is withdrawn from the bottom of the container 60 through a pipe 63. The auxiliary cathode 62 is directly connected to the negative pole of a source of direct current, while the cathode 57 is held at a lower negative potential by a variable resistor 64.

The mixed solution of fission products, transplutonium elements, and neptunium is initially concentrated in the center of the trough 53, as indicated by cross hatching, and the slowest-moving cationic component migrates with the flowing carrier liquid toward the anode, as described with reference to the aforedescribed devices, while the rate of carrier flow and the potential difference between the cathode 57 and the anode 58 are set in such a manner that all other ion species migrate in the opposite direction. When a steady state is reached and maintained, a first sub-fraction is withdrawn with electrolyte and/or carrier liquid from the pipe 56.

The electrolytic bridge 59 and the potential prevailing between the electrodes 57, 62 causes all other components to flow into the container 60, and to be withdrawn therefrom through the pipe 63. Carrier liquid flowing between the pipes 61, 63 prevents cations of these components from reaching the electrode 62. The procedure is repeated in the subsequent stages 51, 52, and may be repeated as often as needed to achieve a desired degree of resolution, a single component or a sub-fraction of a few components being withdrawn from the stream in each stage. Four sub-fractions or components may be withdrawn from a three stage apparatus.

In an actual embodiment of the apparatus of FIG. 7, the trough 53 differed from the afore-described trough 30 mainly by having a length of 30 cm and an available flow section of 3 $cm^2$. 0.5-Molar acetic acid was employed as the carrier liquid and was fed to the trough 53 at a rate of about 100 ml per hour, while 10 ml/hr were supplied to the container 60. The feed rate of the components to be resolved was approximately 2 millimol per hour. The overall applied voltage was 1000 V, and the resistor 64 was set for a current flow of 0.2 amp. between the electrodes 57, 58, and 0.02 amp. between the electrodes 57, 62. A uniform electrolytic temperature of 50°C was maintained as described above.

The resistors 64 were set in such a manner that seven subfractions were recovered. They consisted, respectively of Cs + Rb, Ba, Sr, lanthanides + transplutonium elements, Rh, Ru, and Np, as will be appreciated from the showing of FIG. 4. The resolution was as effective under conditions of continuous operation as in the batch process described with reference to FIG. 4.

The ratio of current flow in the trough to the current flow over the electrolytic bridge could be set by trial and error to achieve the desired result, but it could also be calculated in a conventional manner from the known mobility of the ions to be separated.

While the invention has been described with reference to specific preferred embodiments, it should be understood that the invention is not limited to the examples chosen for the purpose of the disclosure, but is to be construed broadly and limited solely by the scope and spirit of the appended claims.

What is claimed is:

1. A process for separately recovering uranium, plutonium, transplutonium elements, and fission products of said uranium and plutonium from an aqueous solution of atomic reactor fuel, said uranium and said plutonium constituting the major components of said fuel in said solution, and said transplutonium elements and fission products constituting minor constituents, which comprises:
   a. subjecting said solution to electrolysis in a zone between an anode and a cathode in the presence of a complexing agent capable of forming an electrically neutral complex with said plutonium while an aqueous carrier liquid is caused to flow through said zone in a direction from said cathode toward said anode at a rate sufficient so that said complex is carried by said carrier liquid toward said anode, while cations of said uranium, said transplutonium elements and at least a major portion of said fission products migrate toward said cathode;
   b. withdrawing said plutonium free from said uranium, said transplutonium elements, and said major portion of said fission products from said zone near said anode;
   c. withdrawing from said zone near said cathode a liquid fraction free from plutonium and containing said uranium, said transplutonium elements, and said major portion of said fission products;
   d. subjecting said liquid fraction to electrolysis in another zone between another anode and another cathode while an aqueous carrier liquid is caused to flow through said other zone at a rate satisfying the relationship $Eu_t < v < Eu'$ wherein E is the local field strength in said other zone, $u_t$ is the mobility of the ions of said uranium, and $u'$ is the mobility of all other cations present in said other zone, whereby said uranium is carried by said carrier liquid toward said other anode while said transplutonium elements and said major portion of said fission products is carried toward said other cathode by electrolysis;
   e. withdrawing from said other zone near said other anode said uranium free from said transplutonium elements and said fission products; and
   f. withdrawing from said other zone near said other cathode said transplutonium elements and said fission products free from said uranium.

2. A process as set forth in claim 1, wherein said complexing agent is acetic acid.

3. A process for recovering uranium and plutonium free from one another and free from transplutonium elements and fission products of said uranium and said plutonium from an aqueous solution of atomic reactor fuel, said uranium and said plutonium constituting the major components of said fuel in said solution, and said transplutonium elements and fission products constituting minor constituents, which process comprises:
   a. subjecting said solution to electrolysis in a zone between an anode and a cathode spaced from said anode in the presence of a complexing agent capable of forming an electrically neutral complex with said plutonium while an aqueous carrier liquid is caused to flow through said zone transverse to the direction of spacing of said cathode and of said anode at a rate sufficient so that said complex is carried by said carrier liquid across said zone substantially without migrating toward said cathode or said anode, while cations of said uranium, said transplutonium elements and at least a major portion of said fission products migrate toward said cathode, the rate of migration of the cations of said uranium being substantially smaller than that of the cations of said transplutonium elements and of the fission products of said major portion, whereby said plutonium and said uranium accumulate in respective portions of said zone spaced from a portion of said zone in which said transplutonium elements and said fission products accumulate; and
   b. separately withdrawing three liquid fractions from said portions respectively, a first one of said fractions containing plutonium as the sole metallic solute, a second fraction containing uranium as the sole metallic solute, and a third fraction being free from uranium and plutonium and containing said transplutonium elements and said major portion of fission products.

4. A process as set forth in claim 3, wherein said complexing agent is acetic acid.

5. A process as set forth in claim 1, wherein said complexing agent is a water soluble alkanoic acid having 2 to 10 carbon atoms and at least one free carboxyl group, said solution being 0.5 to 4-normal with respect to said alkanoic acid.

6. A process as set forth in claim 5, wherein said carrier liquid includes nitric acid in an amount sufficient to make said carrier liquid 0.02 to 2-normal with respect to said nitric acid.

7. A process as set forth in claim 3, wherein said complexing agent is a water soluble alkanoic acid having 2 to 10 carbon atoms and at least one free carboxyl group, said solution being 0.5 to 4-normal with respect to said alkanoic acid.

8. A process as set forth in claim 7, wherein said carrier liquid includes nitric acid in an amount sufficient to make said carrier liquid 0.02 to 2-normal with respect to said nitric acid.

* * * * *

UNITED STATES PATENT AND TRADEMARK OFFICE
CERTIFICATE OF CORRECTION

PATENT NO. : 3,932,225
DATED : January 13, 1976
INVENTOR(S) : ABDEL-LATIF BILAL ET AL It is certified that error appears in the above-identified patent and that said Letters Patent are hereby corrected as shown below:

Column 13, line 46, change the line to read

-- $Eu_U < v < Eu'$ --.

Signed and Sealed this

*thirtieth* Day of *March 1976*

[SEAL]

*Attest:*

RUTH C. MASON
*Attesting Officer*

C. MARSHALL DANN
*Commissioner of Patents and Trademarks*